United States Patent
Noikas et al.

(10) Patent No.: US 10,344,175 B2
(45) Date of Patent: Jul. 9, 2019

(54) ELECTROSTATIC INK COMPOSITIONS

(71) Applicant: HP Indigo B.V., Amstelveen (NL)

(72) Inventors: Biana Noikas, Rehovot (IL); Dror Kella, Nes Ziona (IL); Adi Vinegrad, Rehovot (IL); Regina Guslitzer, Nes Ziona (IL); Yaron Grinwald, Meitar (IL); Gil Bar-Haim, Holon (IL); Tehila Ben-Ezra, Nes Ziona (IL); Avishai Moshel, Nes Ziona (IL); Emad Masoud, Nes Ziona (IL); Yelena Litichevski, Nes Ziona (IL); Roi Liraz, Tel Aviv (IL); Noam Parvin, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/568,705

(22) PCT Filed: Jul. 17, 2015

(86) PCT No.: PCT/EP2015/066463
§ 371 (c)(1),
(2) Date: Oct. 23, 2017

(87) PCT Pub. No.: WO2017/012639
PCT Pub. Date: Jan. 26, 2017

(65) Prior Publication Data
US 2018/0155565 A1    Jun. 7, 2018

(51) Int. Cl.
*G03G 9/12* (2006.01)
*C09D 11/52* (2014.01)
(Continued)

(52) U.S. Cl.
CPC .............. *C09D 11/52* (2013.01); *C09D 11/10* (2013.01); *C09D 11/50* (2013.01); *G03G 9/122* (2013.01); *G03G 9/13* (2013.01)

(58) Field of Classification Search
CPC .......... G03G 9/12; G03G 9/122; G03G 9/131; G03G 9/132; G03G 9/133
See application file for complete search history.

(56) References Cited

U.S. PATENT DOCUMENTS

| 3,405,683 A | 10/1968 | Jons et al. |
| 3,900,003 A | 8/1975 | Sato et al. |

(Continued)

FOREIGN PATENT DOCUMENTS

| JP | H10297075 | 11/1998 |
| JP | 2006274097 | 10/2006 |

(Continued)

OTHER PUBLICATIONS

Metabion International AG, Fluorescent Due, www.mymetabion.com.

(Continued)

*Primary Examiner* — Peter L Vajda
(74) *Attorney, Agent, or Firm* — Dierker & Kavanaugh PC

(57) ABSTRACT

Herein is disclosed an electrostatic ink composition. In some examples, the electrostatic ink compositions comprise: a carrier liquid; a first resin; and a fluorescent pigment. The fluorescent pigment comprising a fluorescent dye and a second resin matrix, wherein the second resin is selected from the group comprising polyamide resins, polyvinylchlorides, polyolefin resins, polystyrenes, acrylonitrile-butadiene-styrene resins, polycarbonates, poly acrylic and methacrylic acid resins, polyethylene terephthalates, polyamide resins, polyurethanes, epoxy resins, silicone resins, polyester resins, alkyd resins, acrylonitrile polymers, polyesteramides or combinations thereof.

19 Claims, 1 Drawing Sheet

(51) Int. Cl.
*C09D 11/10* (2014.01)
*C09D 11/50* (2014.01)
*G03G 9/13* (2006.01)

(56) References Cited

U.S. PATENT DOCUMENTS

| | | | |
|---|---|---|---|
| 4,073,266 A | | 2/1978 | Arneth et al. |
| 4,342,823 A | | 8/1982 | Grant et al. |
| 4,400,079 A | | 8/1983 | Landa |
| 4,504,138 A | | 3/1985 | Kuehnie et al. |
| 4,690,539 A | | 9/1987 | Radulski et al. |
| 5,176,980 A | * | 1/1993 | Santilli .............. G03G 9/12 430/114 |
| 5,330,868 A | | 7/1994 | Santilli et al. |
| 5,378,272 A | * | 1/1995 | Romagosa .......... C09D 11/02 106/273.1 |
| 5,749,032 A | | 5/1998 | Landa et al. |
| 6,002,893 A | | 12/1999 | Caruthers, Jr. et al. |
| 6,376,147 B1 | | 4/2002 | Bonsignore et al. |
| 6,623,902 B1 | | 9/2003 | Ben-Avraharn et al. |
| 6,861,193 B1 | | 3/2005 | Golodetz |
| 7,054,038 B1 | | 5/2006 | Ostromoukhov et al. |
| 7,927,409 B2 | | 4/2011 | Chatow et al. |
| 2002/0102485 A1 | | 8/2002 | Abe et al. |
| 2003/0104304 A1 | | 6/2003 | Nicholls |
| 2006/0078673 A1 | | 4/2006 | Ripstein |
| 2008/0233313 A1 | * | 9/2008 | Chatow .............. B41M 5/0023 428/30 |
| 2014/0320576 A1 | * | 10/2014 | Bar-Haim ............ G03G 9/131 347/112 |
| 2015/0184006 A1 | * | 7/2015 | Grinwald ............ C09D 11/322 428/207 |

FOREIGN PATENT DOCUMENTS

| | | |
|---|---|---|
| JP | 2011043650 | 3/2011 |
| WO | WO 2007/130069 | 11/2007 |
| WO | WO 2009/064267 | 5/2009 |
| WO | WO 2012/130303 | 10/2012 |
| WO | WO 2013/107498 | 7/2013 |
| WO | WO 2014/015890 | 1/2014 |

OTHER PUBLICATIONS

De Winter, S. "Conversation problems with paintings containing fluorescent layers of paint", CeROArt Date Sheet, 20 pgs., http://ceroart.revues.org/1659?lang=en#ftn5.
"DuPontTM Nucrel® 599", DuPont Packaging & Industrial Polymers Data Sheet, 2010, 6 pages.
"DuPontTM Nucrel® 699", DuPont Packaging & Industrial Polymers Data Sheet, 2010, 6 pages.
Eastman Tackifier Familes, Eastman Tackifier Center, 2 pages http://www.eastman.com/Markets/Tackifier_Center/Tackifier_Families/Pages/Tackifier_Families.aspx;.
"Fluorescence and Fluorescence Applications", IDT Integrated DNA Technologies, 6 pages, http://encyclopedia2.thefreedictionary.com/Fluorescence.
International Search Report and Written Opinion for International Application No. PCT/EP2015/066463 dated Sep. 30, 2015, 11 pages.
Hersch, Roger D., et al., Color Images Visible under UV Light, 2007 http://lsp2.epfl.ch/publications/colour/civuuvl_07.pdf.
"Manufactured goods", Ukeseung Chemical Co., Ltd Data Sheet, 1 page http://www.ukseung.co.kr/esub/product_pro_03_07.aspx.
"Panax "PA" Series Fluorescent Pigments", UMC Technical Information, 1 page.
"Fluorescence", Definition of Fluorescence in the Free Online Encyclopedia, 2005, 1 page, http://encyclopedia2.thefreedictionary.com/Fluorescence.

* cited by examiner

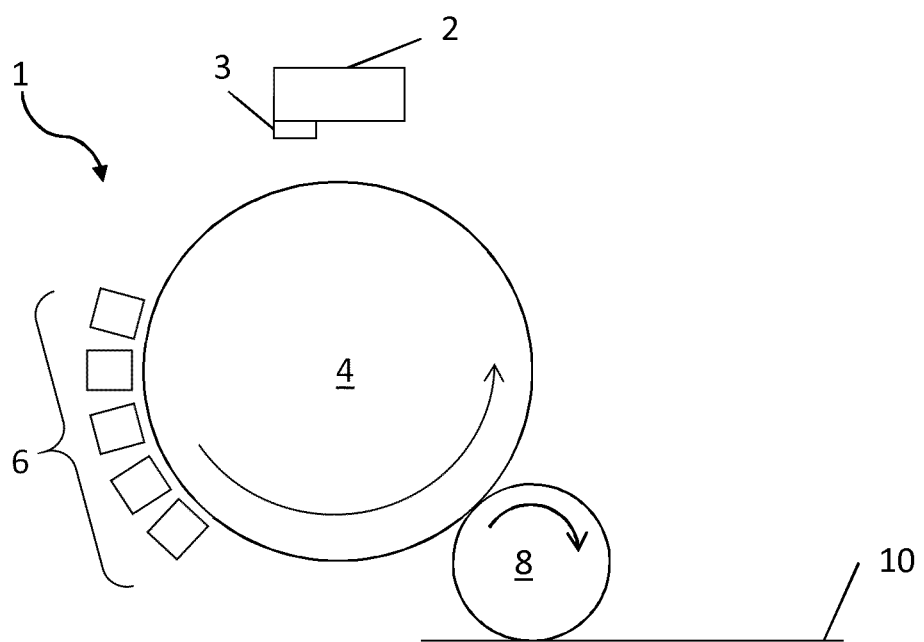

ELECTROSTATIC INK COMPOSITIONS

BACKGROUND

Electrophotographic printing processes, sometimes termed electrostatic printing processes, typically involve creating an image on a photoconductive surface, applying an ink having charged particles to the photoconductive surface, such that they selectively bind to the image, and then transferring the charged particles in the form of the image to a print substrate.

The photoconductive surface may be on a cylinder and is often termed a photo imaging plate (PIP). The photoconductive surface is selectively charged with a latent electrostatic image having image and background areas with different potentials. For example, an electrostatic ink composition including charged toner particles in a liquid carrier can be brought into contact with the selectively charged photoconductive surface. The charged toner particles adhere to the image areas of the latent image while the background areas remain clean. The image is then transferred to a print substrate (e.g. paper) directly or, by being first transferred to an intermediate transfer member, which can be a soft swelling blanket, which is often heated to fuse the solid image and evaporate the liquid carrier, and then to the print substrate.

BRIEF DESCRIPTION OF THE FIGURES

FIG. 1 is a schematic illustration of an example of a Liquid Electro Photographic (LEP) printing apparatus for printing an electrostatic ink composition.

DETAILED DESCRIPTION

Before the methods, compositions, print substrates and related aspects of the disclosure are disclosed and described, it is to be understood that this disclosure is not limited to the particular process steps and materials disclosed herein because such process steps and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "liquid carrier", "liquid carrier," "carrier," or "carrier vehicle" refers to the fluid in which the polymer resin, pigment, charge directors and/or other additives can be dispersed to form a liquid electrostatic ink or electrophotographic ink. Liquid carriers can include a mixture of a variety of different agents, such as surfactants, co-solvents, viscosity modifiers, and/or other possible ingredients.

As used herein, "electrostatic ink composition" generally refers to an ink composition, which may be in liquid form, that is typically suitable for use in an electrostatic printing process, sometimes termed an electrophotographic printing process. The electrostatic ink composition may include chargeable particles of the resin and the pigment dispersed in a liquid carrier, which may be as described herein.

As used herein, "co-polymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic(ally) printing" or "electrophotographic(ally) printing" generally refers to the process that provides an image that is transferred from a photo imaging substrate or plate either directly or indirectly via an intermediate transfer member to a print substrate, e.g. a paper substrate. As such, the image is not substantially absorbed into the photo imaging substrate or plate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrophotographic ink composition to an electric field, e.g. an electric field having a field strength of 1000 V/cm or more, in some examples 1000 V/mm or more.

As used herein, the term "about" is used to provide flexibility to a numerical range endpoint by providing that a given value may be a little above or a little below the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

Unless otherwise stated, any feature described herein can be combined with any aspect or any other feature described herein.

In an aspect, there is provided an electrostatic ink composition. The electrostatic ink composition comprises, in some examples:
 a carrier liquid;
 a first resin; and
 a fluorescent pigment.

In an aspect, there is provided an electrostatic ink composition. The electrostatic ink composition comprises, in some examples:
- a carrier liquid;
- a first resin; and
- a fluorescent pigment comprising a fluorescent dye and a second resin matrix.

In an aspect, there is provided an electrostatic ink composition. The electrostatic ink composition comprises, in some examples:
- a carrier liquid;
- a first resin; and
- a fluorescent pigment comprising a fluorescent dye and a second resin matrix, wherein the second resin is selected from the group comprising polyamide resins, polyvinylchlorides, polyolefin resins, polystyrenes, acrylonitrile-butadiene-styrene resins, polycarbonates, poly acrylic and methacrylic acid resins, polyethylene terephthalates, polyamide resins, polyurethanes, epoxy resins, silicone resins, polyester resins, alkyd resins, acrylonitrile polymers, polyesteramides or combinations thereof.

In an aspect, there is provided a method of producing an electrostatic ink composition. The method comprises, in some examples, combining:
- a first resin;
- a carrier liquid; and
- a fluorescent pigment.

In an aspect, there is provided a method of producing an electrostatic ink composition. The method comprises, in some examples, combining:
- a first resin;
- a carrier liquid; and
- a fluorescent pigment comprising a fluorescent dye and a second resin matrix.

In an aspect, there is provided a method of producing an electrostatic ink composition. The method comprises, in some examples, combining:
- a first resin;
- a carrier liquid; and
- a fluorescent pigment comprising a fluorescent dye and a second resin matrix, wherein the second resin is selected from the group comprising polyamide resins, polyvinylchlorides, polyolefin resins, polystyrenes, acrylonitrile-butadiene-styrene resins, polycarbonates, poly acrylic and methacrylic acid resins, polyethylene terephthalates, polyamide resins, polyurethanes, epoxy resins, silicone resins, polyester resins, alkyd resins, acrylonitrile polymers, polyesteramides or combinations thereof.

In an aspect, there is provided a method of printing an electrostatic ink composition. The method comprises, in some examples:
- providing an electrostatic ink composition;
- contacting the electrostatic ink composition with a latent electrostatic image on a surface to create a developed image; and
- transferring the developed image to a print substrate, wherein the electrostatic ink composition comprise:
- a first resin;
- a carrier liquid; and
- a fluorescent pigment comprising a fluorescent dye and a second resin matrix, wherein the second resin is selected from the group comprising polyamide resins, polyvinylchlorides, polyolefin resins, polystyrenes, acrylonitrile-butadiene-styrene resins, polycarbonates, poly acrylic and methacrylic acid resins, polyethylene terephthalates, polyamide resins, polyurethanes, epoxy resins, silicone resins, polyester resins, alkyd resins, acrylonitrile polymers, polyesteramides or combinations thereof.

Fluorescent Pigment

The electrostatic ink composition comprises a fluorescent pigment. In some examples, the fluorescent pigment is an organic pigment. In some examples, the fluorescent pigment comprises a fluorescent dye and a second resin matrix.

The term "fluorescent pigment" as used herein may refer to a pigment which when exposed to a non-visible wavelength of energy, emits or reflects a visible wavelength. In some examples a fluorescent pigment is a pigment for which the average lifetime of the excited atoms or molecules is less than about $10^{-8}$ seconds. In some examples a fluorescent pigment on exposure to energy having a non-visible wavelength, for example UV radiation, emits or reflects a visible wavelength of light, for example light having a wavelength between about 380 nm to about 750 nm. In some examples UV radiation is radiation having a wavelength in the range of from about 10 nm to about 400 nm, in some examples from about 10 nm to about 380 nm. UV radiation can be subdivided into long wave or "blacklight" (about 315 nm to about 380 nm), medium wave (about 280 nm to about 315 nm) and short wave (less than about 280 nm). In order to cause the fluorescent pigments to fluoresce, UV radiation may be selected such that it is matched to a narrow range of fluorescence of a given fluorescent pigment.

Fluorescent pigments may be selected in order to emit/reflect visible light having a particular wavelength, i.e. a particular colour.

In some examples, the fluorescent pigment may be selected form the Panax PA series of fluorescent pigments. In some examples the fluorescent pigment is selected from: PA-205 (yellow), PA-207 (orange/yellow), PA-305 (orange), PA-400 (orange red), PA-403 (red), PA-503 (pink), PA-605 (violet), PA-707 (magenta), PA-805 (blue) and PA-905 (green), or combinations thereof (all available from UMC United Mineral & Chemical).

In some examples the fluorescent pigment is selected from: PA-205 (yellow), PA-207 (orange/yellow), PA-305 (orange), PA-400 (orange red), PA-403 (red), PA-503 (pink), PA-605 (violet), PA-707 (magenta), PA-805 (blue) and PA-905 (green)(available from UMC United Mineral & Chemical); BMS-PK411 (pink), BMS-YE417 (yellow) and BMS-YE416 (Orange-Yellow) from Brilliant; Corona Magenta ECO21 (Magenta), Signal green ECO18, Microsphere chartreuse MP-CH5510 (Yellow), Microsphere Blue MP-BL6182 (Blue) and Microsphere Magenta MP-MG5518 from DayGlo; IX series-Green and IX series-Red from Flamingo fluorescent pigment; JST-17 (Pink), GWT-17 (Pink), GWT-11 (Green), RPC-17 (Pink) and EA-17 (Pink) from Radiant colors; or combinations thereof.

In some examples, the second resin matrix constitutes from about 90 wt. % to about 99.5 wt. % of the fluorescent pigment, in some examples from about 95 wt. % to about 99 wt. % of the fluorescent pigment.

In some examples, the fluorescent dye constitutes from about 0.5 wt. % to about 10 wt. % of the fluorescent pigment, in some examples from about 1 wt. % to about 5 wt. % of the fluorescent pigment.

In some examples, the fluorescent pigment constitutes greater than 5 wt. % by total solids of the electrostatic ink composition, in some examples greater than 10 wt. % by total solids of the electrostatic ink composition.

In some examples, the fluorescent pigment constitutes up to about 60 wt. % by total solids of the electrostatic ink composition, in some examples up to about 50 wt. % by total solids of the electrostatic ink composition.

In some examples, the fluorescent pigment constitutes from about 10 wt. % to about 50 wt. % by total solids of the electrostatic ink composition.

Second Resin

In some examples, the second resin is selected from the group comprising or consisting of polyamide resins, polyvinylchlorides, polyolefin resins (for example, polyethylenes and/or polypropylenes), polystyrenes, acrylonitrile-butadiene-styrene resins, polycarbonates, poly acrylic and methacrylic acid resins, polyethylene terephthalates, polyamide resins, polyurethanes, epoxy resins, silicone resins, polyester resins, alkyd resins, acrylonitrile polymers, polyesteramides (for example, polymers based on thermoset polyesteramide chemistry) or combinations thereof.

In some examples the second resin consists essentially of polyamide resins, polyvinylchlorides, polyolefin resins (for example, polyethylenes and/or polypropylenes), polystyrenes, acrylonitrile-butadiene-styrene resins, polycarbonates, poly acrylic and methacrylic acid resins, polyethylene terephthalates, polyamide resins, polyurethanes, epoxy resins, silicone resins, polyester resins, alkyd resins, acrylonitrile polymers, or combinations thereof.

In some examples, the second resin comprises or consists of polyamide resins, polyvinylchlorides, polyolefin resins, polyester resins, alkyd resins, acrylonitrile polymers, poly acrylic and methacrylic acid resins or combinations thereof.

In some examples, the second resin matrix is a polyamide resin matrix.

In some examples, the second resin matrix comprises or consists of an aldehyde free material, in some examples a thermoplastic aldehyde free material or a thermosetting aldehyde free material. In some examples, the second resin matrix comprises or consists of an aldehyde-free thermoplastic resin or an aldehyde-free thermosetting resin.

In some examples, the second resin has a melting point of greater than 100° C., in some examples greater than 110° C., in some examples greater than 120° C., in some examples greater than 130° C. The melting point of the second resin may be determined according to ASTM D3418.

Fluorescent Dye

In some examples, the fluorescent dye is an organic fluorescent dye. In some examples the fluorescent dye is based on organic materials. In some examples, the dye is an organic material. In some examples, the fluorescent dye comprises a complex molecular structure, for example a complex organic molecular structure. The complex organic molecular structures may be based on benzene rings that are interconnected, such structures may contain nitrogen, oxygen and/or sulfur. In some examples, the fluorescent dye comprises quinine, fluorescein, pyrazoline, Brilliantsulfoflavine FF (C.I. 56205), Basic Yellow HG (C.I. 46040), Eosine (C.I. 45380), Acridine, AMCA, BODIPY FL-Br2, BODIPY 530/550, BODIPY TMR, BODIPY 558/568, BODIPY 564/570, BODIPY 564/570, BODIPY 576/589, BODIPY 581/591, BODIPY TR, BODIPY 650/665, Cascade Blue, Cy2™, CO™, Cy3.5™, Cy5™, Cy5.5™, Cy7™, Dabcy, Edans, Erythrosin, 6-Fam™, 6-Tetrachlorofluorescein (TET™), Joe, 6-Hexachlorofluorescein (HEX™), NBD, Oregon Green 488, Oregon Green 500, Oregon Green 514, Rhodamine 6G (C.I. 45160), Rhodamine B (C.I. 45170), Rhodamine Green™, Rhodamine Red™, Rhodamin ITC, Rhodol Green, 5(6)-Carboxytetramethylrhodamine (TAMRA™), 6-Carboxytetramethylrhodamine (TAMRA™), 5(6)-Carboxy-X-Rhodamine (ROX™), Texas Red™, NED, VIC, 5' 6-Carboxyfluorescein (FAM), 3' 6-Carboxyfluorescein (FAM), CAL Fluor Gold 540, CAL Fluor Orange 560, CAL Fluor Red 610, LightCycler Red 610, LightCycler 640, LightCycler Red 670, LightCycler 705, WellRED D2-PA, WellRED D3-PA, WellRED D4-PA, IRD 700, IRD 800, Carboxynapthofluorescein, Alexa Fluor 350, Alexa Fluor 405, Alexa Fluor 430, Alexa Fluor 488, Alexa Fluor 532, Alexa Fluor 546, Alexa Fluor 555, Alexa Fluor 568, Alexa Fluor 594, Alexa Fluor 633, Alexa Fluor 647, Alexa Fluor 660, Alexa Fluor 680, Alexa Fluor 700, Alexa Fluor 750, or combinations thereof.

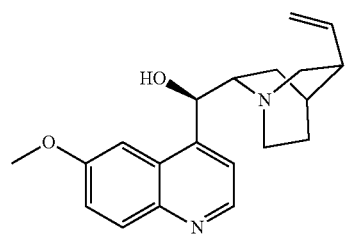

Quinine

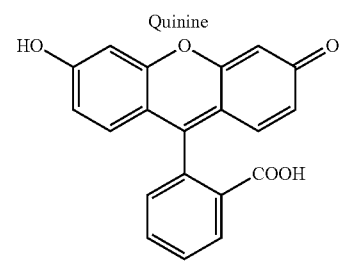

Fluorescein

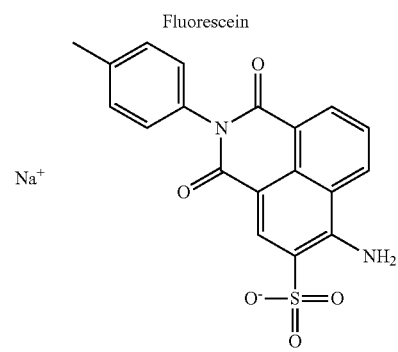

Brilliantsulfoflavine FF (C.I. 56205)

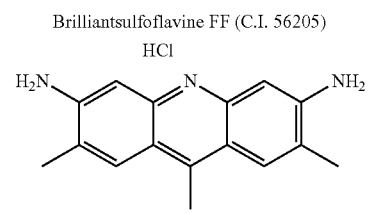

Basic Yellow HG (C.I. 46040)

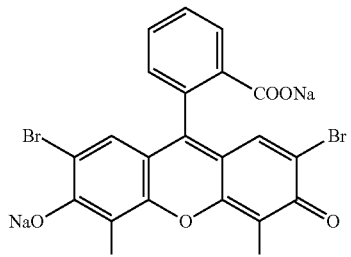

Eosine (C.I. 45380)

-continued

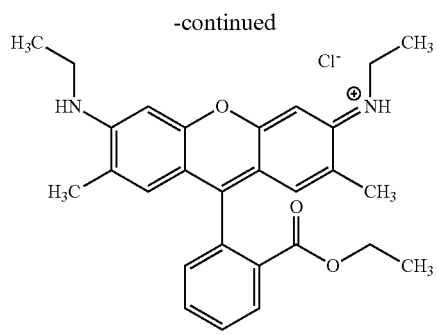

Rhodamine 6G (C.I. 45160)

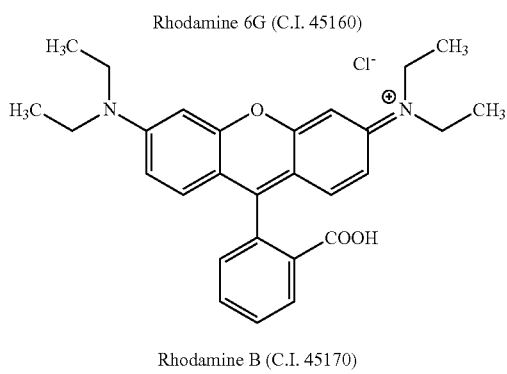

Rhodamine B (C.I. 45170)

Liquid Carrier

The electrostatic ink composition includes a liquid carrier. In some examples, pigment particles including the resin and the fluorescent pigment may be dispersed in the liquid carrier. The liquid carrier can include or be a hydrocarbon, silicone oil, vegetable oil, etc. The liquid carrier can include, but is not limited to, an insulating, non-polar, non-aqueous liquid that can be used as a medium for ink particles, i.e. the ink particles including the resin and, in some examples, a pigment. The liquid carrier can include compounds that have a resistivity in excess of about $10^9$ ohm-cm. The liquid carrier may have a dielectric constant below about 5, in some examples below about 3. The liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the liquid carriers include, but are not limited to, aliphatic hydrocarbons, isoparaffinic compounds, paraffinic compounds, dearomatized hydrocarbon compounds, and the like. In particular, the liquid carriers can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™ Nisseki Naphthesol H™, #0 Solvent L™, #0 Solvent M™, #0 Solvent H™, Nisseki Isosol 300™ Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

The liquid carrier can constitute about 20% to 99.5% by weight of the electrostatic ink composition, in some examples 50% to 99.5% by weight of the electrostatic ink composition. The liquid carrier may constitute about 40 to 90% by weight of the electrostatic ink composition. The liquid carrier may constitute about 60% to 80% by weight of the electrostatic ink composition. The liquid carrier may constitute about 90% to 99.5% by weight of the electrostatic ink composition, in some examples 95% to 99% by weight of the electrostatic ink composition.

The electrostatic ink composition, when printed on a print substrate, may be substantially free from liquid carrier. In an electrostatic printing process and/or afterwards, the liquid carrier may be removed, e.g. by an electrophoresis processes during printing and/or evaporation, such that substantially just solids are transferred to the print substrate. Substantially free from liquid carrier may indicate that the ink printed on the print substrate contains less than 5 wt % liquid carrier, in some examples, less than 2 wt % liquid carrier, in some examples less than 1 wt % liquid carrier, in some examples less than 0.5 wt % liquid carrier. In some examples, the ink printed on the print substrate is free from liquid carrier.

First Resin

The electrostatic ink composition includes a first resin, which may be a thermoplastic resin. A thermoplastic polymer is sometimes referred to as a thermoplastic resin. The first resin may coat the fluorescent pigment. In some examples, the first resin coats the fluorescent pigment such that particles are formed having a core of fluorescent pigment and an outer layer of first resin thereon. The outer layer of first resin may coat the fluorescent pigment partially or completely. In some examples, the first resin is different from the second resin.

The first resin typically includes a polymer. In some examples, the polymer of the first resin may be selected from ethylene acrylic acid copolymers; ethylene methacrylic acid copolymers; ethylene vinyl acetate copolymers; copolymers of ethylene (e.g. 80 wt % to 99.9 wt %), and alkyl (e.g. C1 to C5) ester of methacrylic or acrylic acid (e.g. 0.1 wt % to 20 wt %); copolymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g. copolymer of acrylic or methacrylic acid and at least one alkyl ester of acrylic or methacrylic acid wherein alkyl is, in some examples, from 1 to about 20 carbon atoms, such as methyl methacrylate (e.g. 50 wt % to 90 wt %)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

In some examples, the polymer is a copolymer of an alkylene monomer and a monomer having an acid side group. In some examples the alkylene monomer is an ethylene or a propylene monomer. In some examples, the monomer having an acid side group is an acrylic acid monomer or a methacrylic acid monomer.

The first resin may comprise a polymer having acidic side groups. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The first resin may comprise a polymer, in some examples a polymer having acidic side groups, that has a melt flow rate of less than about 60 g/10 minutes, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of in some examples about 50 g/10 minutes to about 120 g/10 minutes, in some examples 60 g/10 minutes to about 100 g/10 minutes.

In some examples, the polymer having acid side groups has a melt flow rate of greater than about 120 g/10 minutes, in some examples greater than about 200 g/10 minutes, in some examples greater than about 300 g/10 minutes, in some examples greater than about 400 g/10 minutes. In some examples, the polymer having acid side groups has a melt flow rate of about 450 g/10 minutes. In some examples, the first resin is Nucrel 599™ (sold by E. I. du PONT).

In some examples, the polymer having acid side groups has a melt flow rate of less than about 500 g/10 minutes.

In some examples, the polymer having acid side groups has a melt flow rate in the range of about 150 g/10 minutes to about 600 g/10 minutes. In some examples, the polymer having acid side groups has a melt flow rate in the range of about 200 g/10 minutes to about 500 g/10 minutes.

In some examples, the polymer having acid side groups constitutes at least 50 wt. % of the resin, in some examples at least 60 wt. % in some examples at least 80 wt. %, in some examples at least 90 wt. %. In some examples, the polymer having acid side groups has a melt flow rate of greater than about 200 g/10 minutes, in some examples a melt flow rate of greater than about 200 g/10 minutes and up to about 500 g/10 minutes, and constitutes at least 50 wt. % of the resin, in some examples at least 60 wt. % in some examples at least 80 wt. %, in some examples at least 90 wt. %.

The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g. Zn, Na, Li) such as SUR-LYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitute from 5 wt % to about 25 wt % of the copolymer, in some examples from 10 wt % to about 20 wt % of the copolymer.

The first resin may comprise two different polymers having acidic side groups. The two polymers having acidic side groups may have different acidities, which may fall within the ranges mentioned above. The first resin may comprise a first polymer having acidic side groups that has an acidity of from 50 mg KOH/g to 110 mg KOH/g and a second polymer having acidic side groups that has an acidity of 110 mg KOH/g to 130 mg KOH/g.

The first resin may comprise two different polymers having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The first resin may comprise two different polymers having acidic side groups: a first polymer that is a copolymer of ethylene (e.g. 92 to 85 wt %, in some examples about 89 wt %) and acrylic or methacrylic acid (e.g. 8 to 15 wt %, in some examples about 11 wt %) having a melt flow rate of 80 to 110 g/10 minutes and a second polymer that is a co-polymer of ethylene (e.g. about 80 to 92 wt %, in some examples about 85 wt %) and acrylic acid (e.g. about 18 to 12 wt %, in some examples about 15 wt %), having a melt viscosity lower than that of the first polymer, the second polymer for example having a melt viscosity of 15000 poise or less, in some examples a melt viscosity of 10000 poise or less, in some examples 1000 poise or less, in some examples 100 poise or less, in some examples 50 poise or less, in some examples 10 poise or less. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

In any of the first resins mentioned above, the ratio of the first polymer having acidic side groups to the second polymer having acidic side groups can be from about 10:1 to about 2:1. In another example, the ratio can be from about 6:1 to about 3:1, in some examples about 4:1.

The first resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The first resin may comprise a first polymer having a melt viscosity of 15000 poise or more, in some examples 20000 poise or more, in some examples 50000 poise or more, in some examples 70000 poise or more; and in some examples, the first resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The first resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

If the first resin comprises a single type of resin polymer, the resin polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the first resin comprises a plurality of polymers all the polymers of the first resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The first resin may comprise two different polymers having acidic side groups that are selected from copolymers of ethylene and an ethylenically unsaturated acid of either methacrylic acid or acrylic acid; and ionomers thereof, such as methacrylic acid and ethylene-acrylic or methacrylic acid copolymers which are at least partially neutralized with metal ions (e.g. Zn, Na, Li) such as SURLYN® ionomers. The first resin may comprise (i) a first polymer that is a copolymer of ethylene and an ethylenically unsaturated acid of either acrylic acid and methacrylic acid, wherein the ethylenically unsaturated acid of either acrylic or methacrylic acid constitutes from 8 wt % to about 16 wt % of the copolymer, in some examples 10 wt % to 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from 12 wt % to about 30 wt % of the copolymer, in some examples from 14 wt % to about 20 wt % of the copolymer, in some examples from 16 wt % to about 20 wt % of the copolymer in some examples from 17 wt % to 19 wt % of the copolymer.

In some examples, the first resin essentially consists of a copolymer of ethylene and methacrylic acid. In some examples the methacrylic acid of the copolymer of ethylene and methacrylic acid constitutes about 8 wt % to about 12 wt % of the copolymer, in some examples about 9 wt % to about 11 wt % of the copolymer, in some examples about 10 wt. % of the copolymer.

In an example, the first resin constitutes about 5 to 90%, in some examples about 5 to 80%, by weight of the solids of the electrostatic ink composition. In another example, the resin constitutes about 10 to 60% by weight of the solids of the electrostatic ink composition. In another example, the first resin constitutes about 15 to 40% by weight of the solids of the electrostatic ink composition. In another example, the first resin constitutes about 60 to 95% by weight, in some examples from 80 to 90% by weight, of the solids of the electrostatic ink composition.

The first resin may comprise a polymer having acidic side groups, as described above (which may be free of ester side groups), and a polymer having ester side groups. The polymer having ester side groups is, in some examples, a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1 to 50% by weight of the co-polymer, in some examples 5 to 40% by weight, in some examples 5 to 20% by weight of the copolymer, in some examples 5 to 15% by weight of the copolymer. The second monomer may constitute 1 to 50% by weight of the co-polymer, in some examples 5 to 40% by weight of the co-polymer, in some examples 5 to 20% by weight of the co-polymer, in some examples 5 to 15% by weight of the copolymer. In an example, the first monomer constitutes 5 to 40% by weight of the co-polymer, the second monomer constitutes 5 to 40% by weight of the co-polymer, and with the third monomer constituting the remaining weight of the copolymer. In an example, the first monomer constitutes 5 to 15% by weight of the co-polymer, the second monomer constitutes 5 to 15% by weight of the co-polymer, with the third monomer constituting the remaining weight of the copolymer. In an example, the first monomer constitutes 8 to 12% by weight of the co-polymer, the second monomer constitutes 8 to 12% by weight of the co-polymer, with the third monomer constituting the remaining weight of the copolymer. In an example, the first monomer constitutes about 10% by weight of the co-polymer, the second monomer constitutes about 10% by weight of the co-polymer, and with the third monomer constituting the remaining weight of the copolymer. The polymer having ester side groups may be selected from the Bynel® class of monomer, including Bynel 2022 and Bynel 2002, which are available from DuPont®.

The polymer having ester side groups may constitute 1% or more by weight of the total amount of the resin polymers in the first resin, e.g. the total amount of the polymer or polymers having acidic side groups and polymer having ester side groups. The polymer having ester side groups may constitute 5% or more by weight of the total amount of the resin polymers in the first resin, in some examples 8% or more by weight of the total amount of the resin polymers in the first resin, in some examples 10% or more by weight of the total amount of the resin polymers in the first resin, in some examples 15% or more by weight of the total amount of the resin polymers in the first resin, in some examples 20% or more by weight of the total amount of the resin polymers in the first resin, in some examples 25% or more by weight of the total amount of the resin polymers in the first resin, in some examples 30% or more by weight of the total amount of the resin polymers in the first resin, in some examples 35% or more by weight of the total amount of the resin polymers in the first resin. The polymer having ester side groups may constitute from 5% to 50% by weight of the total amount of the resin polymers in the first resin, in some examples 10% to 40% by weight of the total amount of the resin polymers in the first resin, in some examples 15% to 30% by weight of the total amount of the polymers in the first resin.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

In an example, the polymer or polymers of the first resin can be selected from the Nucrel family of toners (e.g. Nucrel 403™, Nucrel 407™ Nucrel 609HS™, Nucrel 908HS™, Nucrel 1202HC™, Nucrel 30707™ Nucrel 1214™, Nucrel 903™, Nucrel 3990™ Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g. Aaclyn 201, Aclyn 246, Aclyn 285, and Aclyn 295), and the Lotader family of toners (e.g. Lotader 2210, Lotader, 3430, and Lotader 8200 (sold by Arkema)).

In some examples, the pigment constitutes a certain wt %, e.g. from 1 wt %, to 60 wt % of the solids of the electrostatic ink composition, and the remaining wt % of the solids of the electrostatic ink composition is formed by the resin and, in some examples, any other additives that are present. The other additives may constitute 10 wt % or less of the solids of the electrostatic ink composition, in some examples 5 wt % or less of the solids of the electrostatic ink composition, in some examples 3 wt % or less of the solids of the electrostatic ink composition. In some examples, the resin may constitute 5% to 99% by weight of the solids in the electrostatic ink composition, in some examples 50% to 90% by weight of the solids of the electrostatic ink composition, in some examples 70% to 90% by weight of the solids of the electrostatic ink composition. The remaining wt % of the solids in the ink composition may be a pigment and, in some examples, any other additives that may be present.

Tackifier

In some examples, the electrostatic ink composition includes a tackifier which is dissolved in the carrier liquid.

A tackifer is soluble in a hydrocarbon carrier liquid. In some examples, the tackifier is capable of forming a film when an electrostatic ink composition comprising a tackier is printed on a print substrate.

In some examples, the tackifier is selected from rosin resins, hydrocarbon resins, terpene resins, copolymers of vinyl acrylate and combinations thereof.

In some examples, rosin resins include any of wood rosin, gum rosin, or by-products of the paper making process (tall oil rosin). In some examples, the utility of rosin resins may be improved via several chemical modifications. These modifications may include esterification, hydrogenation, dimerization, functionalization, or any combination of these. Rosin resins, unlike hydrocarbon resins, are not considered to be polymers. Rosin resins may be a blend of distinct molecules.

Rosin resins may be a mixture of eight closely related rosin acids characterized by three fused six-carbon rings, double bonds that vary in number and location, and a single carboxylic acid group. An example of this family is a dimerized rosic acid with an acid number of 145 and softening point of 144° C.

Hydrocarbon resins include petroleum based aliphatic (C5), aromatic (C9), DCPD (dicyclopentadiene), or mixtures of these. An example is the Regalite™ hydrogenated hydrocarbon resins by Eastman.

Terpene Resins, which may also be referred to as "universal tackifiers", may be derived from terpene feedstocks either from wood sources or citrus fruit.

Examples of copolymers of vinyl acrylate include Plioway Ultra 200 by Eliokem (Omnova) or derivatives of.

In some examples, the electrostatic ink composition comprises about 5 wt. % or less of tackifier by total weight of the composition. In some examples, the electrostatic ink composition comprises about 3 wt. % or less of tackifier by total weight of the composition. In some examples, the electrostatic ink composition comprises about 2 wt. % or less of tackifier by total weight of the composition. In some examples, the electrostatic ink composition comprises about 1 wt. % or less of tackifier by total weight of the composition.

In some examples, the electrostatic ink composition comprises at least about 0.01 wt. % of tackifier by total weight of the composition. In some examples, the electrostatic ink composition comprises at least about 0.1 wt. % of tackifier by total weight of the composition. In some examples, the electrostatic ink composition comprises at least about 0.3 wt. % of tackifier by total weight of the composition.

Charge Director

In some examples, the electrostatic ink composition includes a charge director. The charge director may be added to an electrostatic ink composition in order to impart and/or maintain sufficient electrostatic charge on the pigment particles, e.g. particles comprising a first resin and a fluorescent pigment. In some examples, the charge director may be selected from ionic compounds, such as metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. In some examples, the charge director is selected from, but is not limited to, oil-soluble petroleum sulfonates (e.g. neutral Calcium Petronate™, neutral Barium Petronate™ and basic Barium Petronate™), polybutylene succinimides (e.g. OLOA™ 1200 and Amoco 575), and glyceride salts (e.g. sodium salts of phosphated mono- and diglycerides with unsaturated and saturated acid substituents), sulfonic acid salts including, but not limited to, barium, sodium, calcium, and aluminum salts of a sulfonic acid. The sulfonic acids may include, but are not limited to, alkyl sulfonic acids, aryl sulfonic acids, and sulfonic acids of alkyl succinates (e.g. see WO 2007/130069). In some examples, the charge director imparts a negative charge on the particles of the electrostatic ink composition. In some examples, the charge director imparts a positive charge on the particles of the electrostatic ink composition.

In some examples, the charge director includes a sulfosuccinate moiety of the general formula $[R_1-O-C(O)CH_2CH(SO_3^-)C(O)-O-R_2]$, where each of $R_1'$ and $R_2'$ is an alkyl group. In some examples, the charge director includes nanoparticles of a simple salt and a sulfosuccinate salt of the general formula MAn, wherein M is a metal, n is the valence of M, and A is an ion of the general formula $[R_1'-O-C(O)CH_2CH(SO_3)C(O)-O-R_2']$, where each of $R_1'$ and $R_2'$ is an alkyl group, or other charge directors as found in WO2007130069, which is incorporation herein by reference in its entirety. As described in WO2007130069, the sulfosuccinate salt of the general formula MAn is an example of a micelle forming salt. The charge director may be substantially free or free of an acid of the general formula HA, where A is as described above. The charge director may include micelles of said sulfosuccinate salt enclosing at least some of the nanoparticles. The charge director may include at least some nanoparticles having a size of 200 nm or less, and/or in some examples 2 nm or more. As described in WO2007130069, simple salts are salts that do not form micelles by themselves, although they may form a core for micelles with a micelle forming salt. The ions constructing the simple salts are all hydrophilic. The simple salt may include a cation selected from the group consisting of Mg, Ca, Ba, NH4, tert-butyl ammonium, Li+, and Al+3, or from any sub-group thereof. The simple salt may include an anion selected from the group consisting of $SO_4^{2-}$, $PO^{3-}$, $NO^{3-}$, $HPO_4^{2-}$, $CO_3^{2-}$, acetate, trifluoroacetate (TFA), Cl-, $BF_4^-$, F—, $ClO_4^{4-}$, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH4NO_3$, LiTFA, $Al_2(SO_4)3$, $LiClO_4$ and $LiBF_4$, or any sub-group thereof. The charge director may further include basic barium petronate (BBP).

In the formula $[R_1-O-C(O)CH_2CH(SO_3)C(O)-O-R_2]$, in some examples each of $R_1'$ and $R_2'$ is an aliphatic alkyl group. In some examples, each of $R_1'$ and $R_2'$ independently is a C6-25 alkyl. In some examples, said aliphatic alkyl group is linear. In some examples, said aliphatic alkyl group is branched. In some examples, said aliphatic alkyl group includes a linear chain of more than 6 carbon atoms. In some examples, $R_1'$ and $R_2'$ are the same. In some examples, at least one of $R_1'$ and $R_2'$ is C13H27. In some examples, M is Na, K, Cs, Ca, or Ba. The formula $[R_1-O-C(O)CH_2CH(SO_3^-)C(O)-O-R_2']$ and/or the formula MAn may be as defined in any part of WO2007130069.

The charge director may include one of, some of or all of (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In some examples, the charge director constitutes about 0.001% to 20%, in some examples 0.01% to 20% by weight, in some examples 0.01 to 10% by weight, in some examples 0.01% to 1% by weight of the solids of an electrostatic ink composition. In some examples, the charge director constitutes about 0.001% to 0.15% by weight of the solids of the electrostatic ink composition, in some examples 0.001% to 0.15%, in some examples 0.001% to 0.02% by weight of the solids of an electrostatic ink composition, in some examples 0.1% to 2% by weight of the solids of the electrostatic ink composition, in some examples 0.2% to 1.5% by weight of the solids of the electrostatic ink composition in some examples 0.1% to 1% by weight of the solids of the electrostatic ink composition, in some examples 0.2% to 0.8% by weight of the solids of the electrostatic ink composition.

In some examples, the charge director is present in an amount of from 3 mg/g to 20 mg/g, in some examples from 3 mg/g to 15 mg/g, in some examples from 10 mg/g to 15 mg/g, in some examples from 5 mg/g to 10 mg/g (where mg/g indicates mg per gram of solids of the electrostatic ink composition).

Other Additives

The electrostatic ink composition may include another additive or a plurality of other additives. The other additive or plurality of other additives may be added at any stage of the method. The other additive or plurality of other additives may be selected from a charge adjuvant, a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the first resin. Specifically, the wax phase separates from the first resin phase upon the cooling of the first resin fused mixture on a print substrate during and after the transfer of the ink film to the print substrate, e.g. from an intermediate transfer member, which may be a heated blanket.

In some examples, the electrostatic ink composition includes a charge adjuvant. A charge adjuvant may promote charging of the particles when a charge director is present. The method as described here may involve adding a charge adjuvant at any stage. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or includes aluminum di- or tristearate. In some examples, the charge adjuvant is VCA (an aluminium tristearate and palmitate salt, available from Sigma Aldrich).

The charge adjuvant may be present in an amount of about 0.1 to 5% by weight, in some examples about 0.1 to 1% by weight, in some examples about 0.3 to 0.8% by weight of the solids of the electrostatic ink composition, in some examples about 1 wt % to 3 wt % of the solids of the electrostatic ink composition, in some examples about 1.5 wt % to 2.5 wt % of the solids of the electrostatic ink composition.

The charge adjuvant may be present in an amount of less than 5.0% by weight of total solids of the electrostatic ink composition, in some examples in an amount of less than 4.5% by weight, in some examples in an amount of less than 4.0% by weight, in some examples in an amount of less than 3.5% by weight, in some examples in an amount of less than 3.0% by weight, in some examples in an amount of less than 2.5% by weight, in some examples in an amount of less than 2.0% by weight of the solids of the electrostatic ink composition.

In some examples, the electrostatic ink composition further includes, e.g. as a charge adjuvant, a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is Al$_3$+. The fatty acid anion may be selected from a saturated or unsaturated fatty acid anion. The fatty acid anion may be selected from a C8 to C28 fatty acid anion, in some examples a C14 to C22 fatty acid anion, in some examples a Cm to C20 fatty acid anion, in some examples a C17, C18 or C19 fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

The charge adjuvant, which may, for example, be or include a salt of a multivalent cation and a fatty acid anion, may be present in an amount of 0.1 wt % to 5 wt % of the solids of the electrostatic ink composition, in some examples in an amount of 0.1 wt % to 2 wt % of the solids of the electrostatic ink composition, in some examples in an amount of 0.1 wt % to 2 wt % of the solids of the electrostatic ink composition, in some examples in an amount of 0.3 wt % to 1.5 wt % of the solids of the electrostatic ink composition, in some examples about 0.5 wt % to 1.2 wt % of the solids of the electrostatic ink composition, in some examples about 0.8 wt % to 1 wt % of the solids of the electrostatic ink composition, in some examples about 1 wt % to 3 wt % of the solids of the electrostatic ink composition, in some examples about 1.5 wt % to 2.5 wt % of the solids of the electrostatic ink composition.

In some examples, the electrostatic ink composition comprises substantially no charge adjuvant. In some examples, the electrostatic ink composition lacks a charge adjuvant.

In some examples, the electrostatic ink composition contains substantially none of the materials listed herein as charge adjuvants. In some examples, the electrostatic ink composition contains essentially none of the materials listed herein as charge adjuvants.

In some examples, the electrostatic ink composition contains substantially none or lacks a salt of a multivalent cation and a fatty acid anion, in some examples the multivalent cation and fatty acid anion being as described above. In some examples, the multivalent cation being selected from Group 2, transition metals and Group 3 and Group 4 in the Periodic Table, for example Ca, Sc, Ti, V, Cr, Mn, Fe, Co, Ni, Cu, Zn, Al and Pb. In some examples, the fatty acid anion being selected from a C8 to 028 fatty acid anion, in some examples a C14 to C22 fatty acid anion, in some examples a Cm to C20 fatty acid anion, in some examples a C17, C18 or C19 fatty acid anion. In some examples, the fatty acid anion being selected from a caprylic acid anion, capric acid anion, lauric acid anion, myristic acid anion, palmitic acid anion, stearic acid anion, arachidic acid anion, behenic acid anion and cerotic acid anion.

In some examples, the electrostatic ink composition contains substantially none or lacks aluminum di- or tristearate including VCA.

In some examples, the electrostatic ink composition contains substantially none or lacks: barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate.

In some examples, "substantially no" is used to mean that the particular component, e.g. a charge adjuvant, constitutes less than 0.1 wt. % of the solids of the electrostatic ink composition, in some examples less than 0.05 wt. % of the solids of the electrostatic ink composition, in some examples less than 0.01 wt. % of the solids of the electrostatic ink composition, in some examples less than 0.005 wt. % of the solids of the electrostatic ink composition, in some examples less than 0.001 wt. % of the solids of the electrostatic ink composition, in some examples less than 0.0005 wt. % of the solids of the electrostatic ink composition, in some examples less than 0.0001 wt. % of the solids of the electrostatic ink composition.

Method of Producing an Electrostatic Ink Composition

Also provided is a method of producing an electrostatic ink composition. The method comprises, in some examples, combining a first resin, a fluorescent pigment and a carrier liquid.

In some examples, the method comprises first combining a first resin and a carrier liquid and subsequently adding the fluorescent pigment.

In some examples, the method comprises combining a first resin and carrier liquid to form a paste and subsequently adding the fluorescent pigment.

In some examples, the first resin and carrier liquid are combined and heated to a temperature in the range of 100° C. to 200° C., in some examples 120° C. to 150° C., for example to melt the first resin. In some examples the first resin and carrier liquid are combined and heated to a temperature above the melting point of the first resin. In some examples, the first resin and carrier liquid are combined and mixed at a temperature in the range of 100° C. to 200° C., in some examples 120° C. to 150° C., for example to melt the first resin. In some examples, the first resin and carrier liquid are heated to a temperature above the melting point of the first resin before, during or after mixing. In some examples, after combining the first resin and the carrier liquid, the resulting mixture is cooled to have a temperature of lower than 100° C. before the fluorescent pigment is added to the first resin and carrier liquid mixture. In some examples, the resulting mixture is cooled to have a temperature of 90° C. or lower, in some examples 80° C. or lower, in some examples 60° C. or lower, in some examples 50° C. or lower, before the fluorescent pigment is added to the first resin and carrier liquid mixture.

In some examples, after combining the first resin and the carrier liquid, the resulting mixture is cooled to have a temperature of lower than the melting point of the first resin before the fluorescent pigment is added to the first resin and carrier liquid mixture.

In some examples, the method comprises adding the fluorescent pigment to the first resin and carrier liquid mixture to form pigment particles comprising the fluorescent pigment and the first resin.

In some examples the method comprises grinding the first resin in the presence of the carrier liquid to form a paste.

In some examples, the method comprises heating and mixing the first resin in the presence of a carrier liquid to form a paste.

In some examples, the method comprises adding a fluorescent pigment to a paste comprising the resin and carrier liquid to form pigment particles comprising the fluorescent pigment and the first resin. In some examples, the method comprises adding a fluorescent pigment to the paste and grinding the fluorescent pigment and the paste to form pigment particles comprising the fluorescent pigment and the first resin. In some examples, the method comprises grinding the fluorescent pigment and the paste with a charge adjuvant. In some examples, the method comprises grinding the fluorescent pigment and paste with substantially no charge adjuvant.

In some examples, the method comprises adding a tackifier to the electorstatic ink composition.

In some examples, the method comprises grinding the fluorescent pigment and a paste comprising the resin and carrier liquid at a grinding speed of at least 50 rpm. In some examples, the method comprises grinding the fluorescent pigment and a paste comprising the resin and carrier liquid at a grinding speed of up to about 600 rpm. In some examples, the method comprises grinding the fluorescent pigment and a paste comprising the resin and carrier liquid for at least 1 hour, in some examples for at least 2 hours. In some examples, the method comprises grinding the fluorescent pigment and a paste comprising the resin and carrier liquid for up to about 12 hours. In some examples, the method comprises a cold grinding phase, for example at a temperature of below 50° C., for example about 45° C., and a hot grinding phase, for example at a temperature above 50° C., in some examples about 55° C. In some examples, grinding of the paste and fluorescent pigment in the hot grinding phase is for at least 1 hour, in some examples up to 2 hours. In some examples, grinding of the paste and fluorescent pigment in the cold grinding phase is for at least 1 hour, in some examples at least 2 hours, in some examples at least 5 hours, in some examples up to 12 hours. In some examples, grinding of the paste and fluorescent pigment takes place first in a hot phase and then in a cold phase.

Printing Process and Print Substrate

Also provided is a method of electrostatic printing, the method including:
producing or providing an electrostatic ink composition as described herein,
contacting the electrostatic ink composition with a latent electrostatic image on a surface to create a developed image, and
transferring the developed image to a print substrate, in some examples via an intermediate transfer member.

In some examples, the surface on which the (latent) electrostatic image is formed or developed may be on a rotating member, e.g. in the form of a cylinder. The surface on which the (latent) electrostatic image is formed or developed may form part of a photo imaging plate (PIP). The method may involve passing the electrostatic ink composition between a stationary electrode and a rotating member, which may be a member having the surface having the (latent) electrostatic image thereon or a member in contact with the surface having the (latent) electrostatic image thereon. A voltage is applied between the stationary electrode and the rotating member, such that particles adhere to the surface of the rotating member. The intermediate transfer member, if present, may be a rotating flexible member, which may be heated, e.g. to a temperature of from 80 to 160° C.

In some examples, the method of electrostatic printing comprises providing a second electrostatic ink composition in addition to a first electrostatic ink composition the first and second electrostatic ink composition having different fluorescent colours; contacting the first electrostatic ink composition with a first latent electrostatic image on a surface to create a developed first fluorescent coloured image; contacting the second electrostatic ink composition with a second latent electrostatic image on a surface to create a second developed second fluorescent coloured image; and transferring the developed first and second images to a print substrate such that a multi-coloured image is formed on the print substrate.

In some examples a plurality of electrostatic ink compositions are provided. In some examples, each of the plurality of electrostatic ink compositions has a different fluorescent colour to each of the other of the plurality of electrostatic ink compositions. The method may comprise contacting each of the plurality of electrostatic ink compositions with a different latent electrostatic image to create a plurality of developed images. In some examples, each developed image is formed from one of the plurality of electrostatic ink compositions. Each of the plurality of developed images may then be transferred to a print substrate such that a multi-coloured fluorescent image is formed on the print substrate.

In some examples, the method comprises providing a non-fluorescent electrostatic ink composition (i.e. an electrostatic ink composition having a composition as described herein except the fluorescent pigment is replaced by a non-emitting pigment, for example ElectroInk® from HP Indigo, such as black ElectroInk®). The non-fluorescent electrostatic ink composition may be provided in addition to an electrostatic ink composition as described herein (i.e. a fluorescent electrostatic ink composition) or in addition to a plurality of electrostatic ink compositions.

In some examples, a plurality of electrostatic ink compositions are printed using a LEP printing apparatus comprising a Raster Image Processor (RIP).

The present disclosure also provides an electrostatic ink composition producible according to the method described herein. There may also be provided a print substrate having printed thereon an electrostatic ink composition as described herein and/or producible according to the method described herein.

The print substrate may be any suitable substrate. The substrate may be any suitable substrate capable of having an image printed thereon. The substrate may include a material selected from an organic or inorganic material. The material may include a natural polymeric material, e.g. cellulose. The material may include a synthetic polymeric material, e.g. a polymer formed from alkylene monomers, including, but not limited to, polyethylene and polypropylene, and co-polymers such as styrene-polybutadiene. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), mixtures thereof. In an example, the substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print substrate such as paper. The cellulosic print substrate is, in some examples, a coated cellulosic print. In some examples, a primer may be coated onto the print substrate, before the electrostatic ink composition is printed onto the print substrate.

FIG. 1 shows a schematic illustration of a Liquid Electro Photographic (LEP) printing apparatus which may be used to print an electrostatic ink composition as described herein. An image, including any combination of graphics, text and images, may be communicated to the LEP printing apparatus 1. According to an illustrative example, in order to print the electrostatic ink composition, firstly, the photo charging unit 2 deposits a uniform static charge on the photo-imaging cylinder 4 and then a laser imaging portion 3 of the photo charging unit 2 dissipates the static charges in selected portions of the image area on the photo-imaging cylinder 4 to leave a latent electrostatic image. The latent electrostatic image is an electrostatic charge pattern representing the image to be printed. The electrostatic ink composition is then transferred to the photo-imaging cylinder 4 by Binary Ink Developer (BID) units 6. The BID units 6 present a uniform film of the electrostatic ink composition to the photo-imaging cylinder 4. A first resin component of the electrostatic ink composition may be electrically charged by virtue of an appropriate potential applied to the electrostatic ink composition in the BID unit. The charged first resin component which, by virtue of an appropriate potential on the electrostatic image areas, is attracted to the latent electrostatic image on the photo-imaging cylinder 4 (first transfer). The electrostatic ink composition does not adhere to the uncharged, non-image areas and forms an image on the surface of the latent electrostatic image. The photo-imaging cylinder 4 then has a developed electrostatic ink composition image on its surface.

The image is then transferred from the photo-imaging cylinder 4 to the intermediate transfer member (ITM) 8 by virtue of an appropriate potential applied between the photo-imaging cylinder 4 and the ITM 8, such that the charged electrostatic ink composition is attracted to the ITM 8 (second transfer). The image is then dried and fused on the ITM 8 before being transferred to a print substrate 10.

Between the first and second transfers the solid content of the electrostatic ink composition image is increased and the electrostatic ink composition is fused on to the ITM 8. For example, the solid content of the electrostatic ink composition image deposited on the ITM 8 after the first transfer is typically around 20%, by the second transfer the solid content of the image is typically around 80-90%. This drying and fusing is typically achieved by using elevated temperatures and air flow assisted drying. In some examples, the ITM 8 is heatable.

In some examples, the LEP printing apparatus 1 comprises a plurality of BID units 6 and each BID unit 6 comprises a reservoir containing an electrostatic ink composition. In some examples, each of the plurality of BID units 6 contain a different coloured electrostatic ink composition. In such examples, a multi-coloured fluorescent image may be provided on a print substrate 10.

A multi-coloured fluorescent image disposed on the print substrate may be obtained in one pass of the print substrate 10 through the LEP printing apparatus 1 or in multiple passes of the print substrate 10 through the LEP printing apparatus 1.

In examples in which a multi-coloured fluorescent image disposed on a print substrate 10 is obtained in one pass of the print substrate 10 through the LEP printing apparatus 1, after forming the latent electrostatic image on the surface of the photo-imaging cylinder 4, a first coloured electrostatic ink composition is transferred from one of the plurality of BID units 6 to the photo-imaging cylinder 4 by electrical forces to form a first coloured electrostatic ink image on the photo-imaging cylinder 4. In this one pass method, the LEP printing composition image is then transferred from the photo-imaging cylinder 4 to the ITM 8. A second latent electrostatic image is then formed on the surface of the photo-imaging cylinder 4 and a second coloured electrostatic ink image is then formed on the surface of the photo-imaging cylinder 4. The second coloured electrostatic ink image is then transferred from the surface of the photo-imaging cylinder 4 to the ITM 8 to form a second coloured electrostatic image disposed on the first coloured electrostatic image on the ITM 8. Subsequent coloured electrostatic ink images may then be formed on top of the first and second coloured electrostatic ink images disposed on the ITM 8 before transfer of the coloured electrostatic ink images from the ITM 8 to the print substrate.

In examples in which a multi-coloured fluorescent image disposed on a print substrate 10 is obtained in multiple passes of the print substrate 10 through the LEP printing apparatus 1, different coloured electrostatic ink images are formed on the photo-imaging cylinder 4 as described above for the single-pass method. However, in the multi-pass method, each different coloured electrostatic ink image is transferred from the photo-imaging cylinder 4 to the ITM 8 and then from the ITM 8 to the print substrate before the next coloured electrostatic ink image is formed on the photo-imaging cylinder 4 and the transferred to the print substrate 10 from the photo-imaging cylinder 4 via the ITM 8. The print substrate 10 undergoes additional passes through the LEP printing apparatus 1 for each additional coloured electrostatic ink composition image applied to the print substrate 10.

In some examples, the LEP printing apparatus comprises a Raster Image Processor (RIP). In some examples the RIP is configured to communicate with the laser imaging portion 3 and/or the BID units 6 to define which coloured electrostatic ink composition available for printing should be sent to which location on the photo-imaging cylinder 4 in order to produce a pre-determined multi-coloured fluorescent image on the print substrate 10.

EXAMPLES

The following illustrate examples of the compositions, methods and other aspects described herein. Thus, these Examples should not be considered as limitations of the present disclosure, but are merely in place to teach how to make examples of the present disclosure.

Example 1

An electrostatic ink composition was prepared using a lab grinding tool called attritor S1 (Union Process), by mixing the formulation set out below in Table 1:

TABLE 1

| Material | Amount (g) | % NVS | Formulation composition (%) |
|---|---|---|---|
| Resin Nucrel ® 599 | 726.6 | 33.9 | 59.5 |
| Pigment PA-403 | 165.6 | 100 | 40 |
| VCA | 2.07 | 100 | 0.5 |
| Isopar L | 1405.7 | 100 | |
| Sum | 2300.0 | | |
| % nvs | 18 | | |

Resin: Nucrel 599 [Resin D] from Dupont—copolymer of ethylene and methacrylic acid, made with nominally 10 wt % methacrylic acid.

Fluorescent Pigment: UMC PA-403 Red FLUORECENT RED (obtained from united minerals & chemical corporation)

VCA (charge adjuvant)—an aluminium tristearate and palmitate salt, available from Reidel de-Haan.

Isopar L, an iso-parafinic oil manufactured by EXXON.

NCD indicates a natural charge director having the components (i) natural soya lecithin, (ii) basic barium petronate, and (iii) dodecyl benzene sulphonic acid, amine salt, with the components (i), (ii) and (iii) being present in the weight ratios of 6.6%:9.8:3.6%.

The first resin Nucrel®599 in the presence of Isopar-L was inserted at 40% NVS to a Ross mixer, the first resin was melted in the presence of Isopar and mixed at 50 rpm for 90 min at temperature of 120° C.-150° C. The speed of the Ross mixer was then raised to 70 rpm for 120 min. Then the temperature was lowered to room temperature and the speed of the Ross mixer was lowered to 50 rpm, mixing was continued for 30 min. A paste comprising the first resin and the carrier liquid was formed.

A fluorescent pigment (UMC PA-205, as described above) was ground with the paste at a ratio of 4:6 (pigment:first resin) by weight for 12 h (in the presence of 0.5% (by total weight of solids VCA) in a SS attritor, without any prior treatment. The grinding procedure comprised 2 phases: 1.5 hr hot phase (58° C., 250 rpm) and then a 10.5 hr cold phase (45° C., 250 rpm). The overall material in the attritor was 2300 g, with a solid content of 18%.

The ground material was then diluted with Isopar-L to form a 3% NVS working dispersion (WD). A charge director (NCD, as described above) was then added (5.5 mg/1 g Isopar) to the WD to form an electrostatic ink composition to be printed using a LEP printing apparatus.

Example 2

The electrostatic ink composition of Example 2 was prepared as the electrostatic ink composition of Example 1 except that no VCA was added.

Example 3

The electrostatic ink composition of Example 3 was prepared as the electrostatic ink composition of Example 1 except that the fluorescent pigment used was UMC PA-205 Yellow, FLUORECENT YELLOW (obtained from united minerals & chemical corporation).

Example 4

The electrostatic ink composition of Example 4 was prepared as the electrostatic ink composition of Example 1 except that the fluorescent pigment used was UMC PA-805 Blue FLUORECENT BLUE (obtained from united minerals & chemical corporation).

Example 5

The electrostatic ink composition of Example 5 was prepared as the electrostatic ink composition of Example 1 except that the fluorescent pigment used was UMC PA-905 Green FLUORECENT GREEN (obtained from united minerals & chemical corporation).

Test Results

The electrostatic ink compositions of Examples 1-5 were printed using an Indigo 7000 series press.

Each of the electrostatic ink compositions of Examples 1-5 were successfully printed on to a paper substrate and found to fluoresce when exposed to UV radiation. Multi-coloured fluorescent images, e.g. YGRB, RGB and YRB multi-coloured fluorescent images, were also printed using combinations of the electrostatic ink compositions of Examples 1-5.

Further Examples

The inventors have also produced electrostatic ink compositions as described in Examples 1-5 above in which the first resin consisted of a 4:1 mixture of Nucrel®699:AC-5120. The electrostatic ink compositions produced using this alternative first resin were also functional as LEP fluorescent ink and were successfully printed using an Indigo 7000 series press.

The electrostatic ink compositions produced according to Examples 1-5 but using a first resin consisting of a 4:1 mixture of Nucrel®699:AC-5120 were also prepared by adding 2 wt. % of a tackifier (Regalite™) before the electrostatic ink composition was printed.

It was found that using Nucrel® 599 as the first resin (i.e. a polymer having acid side groups and a melt flow rate in the range of about 200 g/10 minutes to about 500 g/10 minutes) allowed for improved transfer from the ITM to the print substrate on LEP printing of the electrostatic ink composition.

It was also found that adding a tackifier to the electrostatic ink composition allowed for improved transfer from the ITM to the print substrate on LEP printing of the electrostatic ink composition.

The Inventors were able to print multi-coloured fluorescent images using the exemplified electrostatic ink compositions. An LEP printing apparatus (a HP Indigo 7000 series printing press) comprising a RIP was used to print multi-coloured fluorescent images using the red, yellow and blue fluorescent inks of Examples 1, 3 and 4, and also a non-fluorescent black electrostatic ink (black ElectoInk® from HP Indigo). The multi-coloured fluorescent images produced exhibited purple, green, orange, red, brown and grey tones, as well as various tones in between, in addition to red, yellow and blue tones.

The inventors have also found that electrostatic ink compositions can also be prepared using the following fluorescent pigments: BMS-PK411 (pink), BMS-YE417 (yellow) and BMS-YE416 (Orange-Yellow) from Brilliant; Corona Magenta ECO21 (Magenta), Signal green ECO18, Microsphere chartreuse MP-CH5510 (Yellow), Microsphere Blue MP-BL6182 (Blue) and Microsphere Magenta MP-MG5518 from DayGlo; IX series-Green and IX series-Red from Flamingo fluorescent pigment; JST-17 (Pink), GWT-17 (Pink), GWT-11 (Green), RPC-17 (Pink) and EA-17 (Pink) from Radiant colors.

While the method, the electrostatic ink composition and related aspects have been described with reference to certain examples, those skilled in the art will appreciate that various modifications, changes, omissions, and substitutions can be made without departing from the spirit of the disclosure. It is intended, therefore, that the method, compositions and related aspects be limited by the scope of the following claims. The features of any dependent claim can be combined with the features of any of the other dependent claims, and any independent claim.

The invention claimed is:

1. An electrostatic ink composition comprising:
a carrier liquid;
a charge director;
substantially no charge adjuvant;
a first resin; and
a fluorescent pigment comprising a fluorescent dye and a second resin matrix, wherein the second resin matrix is a polyamide resin matrix that constitutes from about 90 wt. % to about 99.5 wt. % of the fluorescent pigment.

2. The electrostatic ink composition according to claim 1, wherein the fluorescent pigment constitutes from about 10 wt. % to about 50 wt. % of the total solids of the electrostatic ink composition.

3. The electrostatic ink composition according to claim 1, wherein the fluorescent dye is an organic dye.

4. The electrostatic ink composition according to claim 1, wherein the first resin comprises a polymer having acid side groups.

5. The electrostatic ink composition according to claim 4, wherein the first resin comprises a copolymer of an alkylene monomer and a monomer having an acid side group.

6. The electrostatic ink composition according to claim 5, wherein the alkylene monomer is an ethylene or a propylene monomer and the monomer having the acid side group is an acrylic acid monomer or a methacrylic acid monomer.

7. The electrostatic ink composition according to claim 4, wherein the polymer having acid side groups has a melt flow rate of greater than about 200 g/10 minutes.

8. The electrostatic ink composition according to claim 7, wherein the polymer having acid side groups and having the melt flow rate of greater than about 200 g/10 minutes constitutes at least 50 wt. % of the first resin.

9. The electrostatic ink composition according to claim 1 comprising a tackifier dissolved in the carrier liquid.

10. A method for producing an electrostatic ink composition, the method comprising combining:
a first resin;
a charge director;
substantially no charge adjuvant;
a carrier liquid; and
a fluorescent pigment comprising a fluorescent dye and a second resin matrix, wherein the second resin matrix is a polyamide resin matrix that constitutes from about 90 wt. % to about 99.5 wt. % of the fluorescent pigment.

11. The method according to claim 10 comprising first combining the first resin and the carrier liquid to form a resin and carrier liquid mixture, and subsequently combining the fluorescent pigment with the first resin and carrier liquid mixture.

12. The method according to claim 10, wherein the first resin and carrier liquid are combined and mixed at a temperature in the range of 100° C. to 200° C., and the resulting mixture is cooled to have a temperature of lower than 100° C. before the fluorescent pigment is added to the resin and carrier liquid mixture.

13. A method for producing an electrostatic ink composition, the method comprising combining:
a first resin;
a charge director;
substantially no charge adjuvant;
a carrier liquid; and
a fluorescent pigment comprising a fluorescent dye and a second resin matrix, wherein:
the second resin matrix is selected from the group comprising polyamide resins, polyvinylchlorides, polyolefin resins, polystyrenes, acrylonitrile-butadiene-styrene resins, polycarbonates, poly acrylic and methacrylic acid resins, polyethylene terephthalates, polyamide resins, polyurethanes, epoxy resins, silicone resins, polyester resins, alkyd resins, acrylonitrile polymers, polyesteramides or combinations thereof; and
the second resin matrix constitutes from about 90 wt. % to about 99.5 wt. % of the fluorescent pigment;
and wherein the first resin and carrier liquid are combined and mixed at a temperature in the range of 100° C. to 200° C., and the resulting mixture is cooled to have a temperature of lower than 100° C. before the fluorescent pigment is added to the resin and carrier liquid mixture.

14. The electrostatic ink composition according to claim 1, wherein the charge director is selected from the group consisting of metal salts of sulfo-succinates, metal salts of oxyphosphates, metal salts of alkyl-benzenesulfonic acid, polyoxyethylated alkylamines, lecithin, polyvinylpyrrolidone, organic acid esters of polyvalent alcohols, polybutylene succinimides, glyceride salts, and combinations thereof.

15. The method according to claim 10, wherein the charge director is selected from the group consisting of metal salts of sulfo-succinates, metal salts of oxyphosphates, metal salts of alkyl-benzenesulfonic acid, polyoxyethylated alkylamines, lecithin, polyvinylpyrrolidone, organic acid esters of polyvalent alcohols, polybutylene succinimides, glyceride salts, and combinations thereof.

16. The method according to claim 13, wherein the charge director is selected from the group consisting of metal salts of sulfo-succinates, metal salts of oxyphosphates, metal salts of alkyl-benzenesulfonic acid, polyoxyethylated alkylamines, lecithin, polyvinylpyrrolidone, organic acid esters of polyvalent alcohols, polybutylene succinimides, glyceride salts, and combinations thereof.

17. The electrostatic ink composition according to claim 1, wherein the fluorescent dye constitutes from about 0.5 wt. % to about 10 wt. % of the fluorescent pigment.

18. The method according to claim 10, wherein the fluorescent dye constitutes from about 0.5 wt. % to about 10 wt. % of the fluorescent pigment.

19. The method according to claim 13, wherein the fluorescent dye constitutes from about 0.5 wt. % to about 10 wt. % of the fluorescent pigment.

\* \* \* \* \*